US012598204B2

(12) United States Patent
Derbeko et al.

(10) Patent No.: US 12,598,204 B2
(45) Date of Patent: Apr. 7, 2026

(54) FEDERATED ABNORMAL PROCESS DETECTION FOR KUBERNETES CLUSTERS

(71) Applicant: Fortinet, Inc., Sunnyvale, CA (US)

(72) Inventors: Philip Derbeko, Modiin (IL); Omer Medan, Raanana (IL)

(73) Assignee: Fortinet, Inc., Sunnyvale, CA (US)

( * ) Notice: Subject to any disclaimer, the term of this patent is extended or adjusted under 35 U.S.C. 154(b) by 76 days.

(21) Appl. No.: 18/401,589

(22) Filed: Dec. 31, 2023

(65) Prior Publication Data

US 2025/0220031 A1 Jul. 3, 2025

(51) Int. Cl.
*H04L 9/40* (2022.01)
*G06F 8/65* (2018.01)
(52) U.S. Cl.
CPC ............ *H04L 63/1425* (2013.01); *G06F 8/65* (2013.01)
(58) Field of Classification Search
CPC ................................ H04L 63/1425; G06F 8/65
See application file for complete search history.

(56) References Cited

U.S. PATENT DOCUMENTS

| | | | | |
|---|---|---|---|---|
| 11,201,955 | B1 * | 12/2021 | Sachdeva | ................ H04L 69/22 |
| 11,818,156 | B1 * | 11/2023 | Parikh | ................. G06F 16/9537 |
| 12,008,222 | B1 * | 6/2024 | Niv | ..................... H04L 63/1416 |
| 2022/0121741 | A1 * | 4/2022 | Araujo | ................. G06F 21/566 |
| 2022/0232042 | A1 * | 7/2022 | Crabtree | ............. H04L 63/1425 |
| 2022/0294816 | A1 * | 9/2022 | Martin | ................. H04L 67/535 |
| 2025/0358188 | A1 * | 11/2025 | Adapa | ................ H04L 63/1441 |

* cited by examiner

*Primary Examiner* — Michael Won
(74) *Attorney, Agent, or Firm* — Law Office of Dorian Cartwright; Dorian Cartwright

(57) ABSTRACT

A baseline of behavior is received for a set of containers utilized by the Kubernetes manager from a cluster agent. The processes running on the set containers and network traffic generated by the set of containers, to identify anomalous behavior relative to the baseline. Subsequent to the container updates, and responsive to detecting the anomalous behavior exceeds a threshold for a specific container, anomalous data is sent to the cluster agent including an identification and version of the specific container and a description of abnormal behavior. The cluster agent determines a new rule is necessary to define the new behavior and distributes the new rule to the plurality of Kubernetes managers that are affected.

8 Claims, 5 Drawing Sheets

100

100

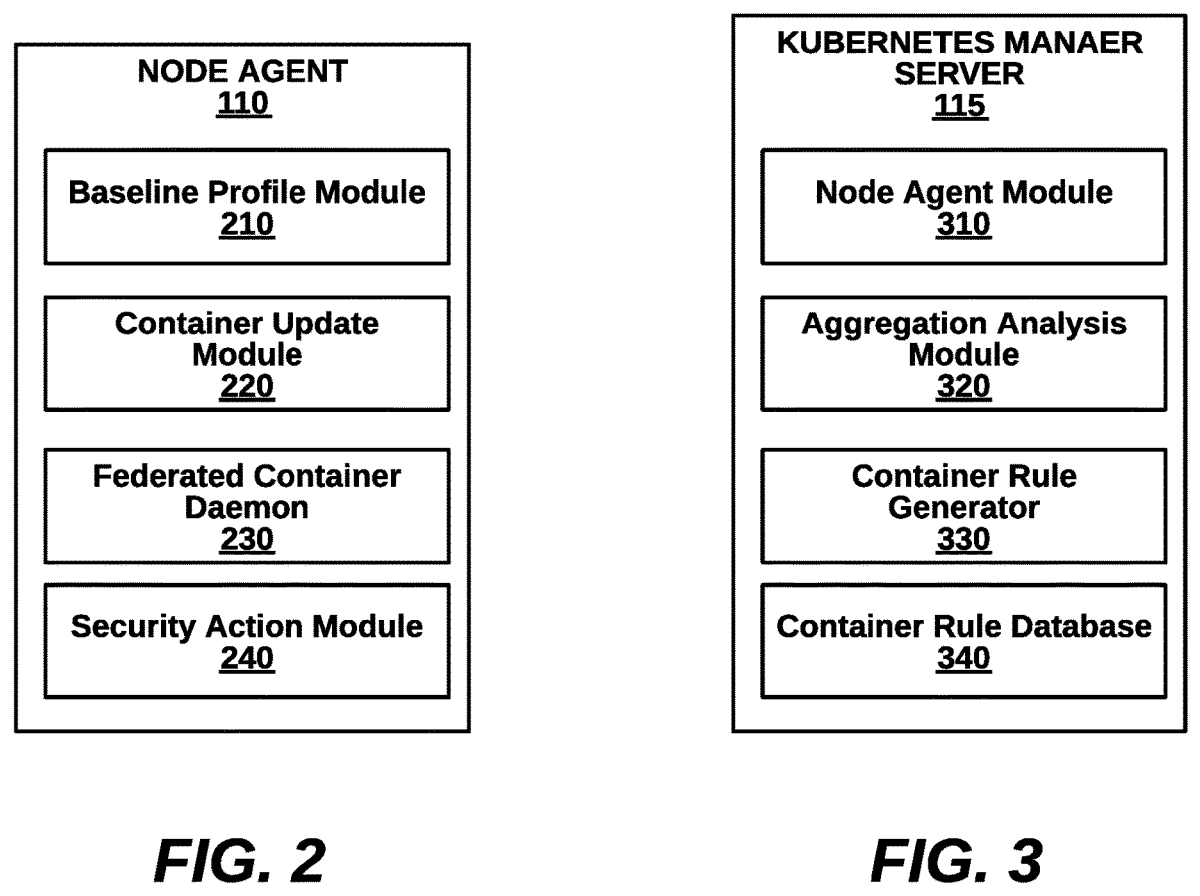

NODE AGENT
110

Baseline Profile Module
210

Container Update
Module
220

Federated Container
Daemon
230

Security Action Module
240

FIG. 2

KUBERNETES MANAER
SERVER
115

Node Agent Module
310

Aggregation Analysis
Module
320

Container Rule
Generator
330

Container Rule Database
340

FIG. 3

FEDERATED ABNORMAL PROCESS DETECTION FOR KUBERNETES CLUSTERS

FIELD OF THE INVENTION

The invention relates generally to computer networks, and more specifically, for federated abnormal process detection in Kubernetes clusters.

BACKGROUND

As many of the computing workflows move to the cloud, there is a need to protect cloud environments. There are few differences between cloud and on-premise environments. One of them is the use of pre-packaged software called containers and dynamic nature of the cloud.

Containers are software packages ready to be executed on any given server without a need of long installation. The package is pulled from a known repository, which might be cached on the server itself, and executed. Well-known repositories allow for wide and easy distributions of software. The lack of installation allows rapid creation and deletion of containers.

Combined with a change in container images versions, which might add/change and remove some software components, it is very hard to closely monitor such a dynamic environment.

Ultimately, system administrator or security operators would like to know that the container images are not tampered, i.e. no software was added to them or changed in the image, and that there is no container that has an abnormal execution path. One technique to solve this issue is to enumerate images that are present in the container and check that all running processes are part of the image. However, this technique does not work well for containers that contain large amounts of binaries and dynamic libraries (Ubuntu/CentOS), both from performance perspective and when the shipped binaries are enough to launch the attack.

What is needed is a robust technique for federated abnormal process detection in Kubernetes clusters, in order to dynamically updating rules for new versions of containers.

SUMMARY

To meet the above-described needs, methods, computer program products, and systems for federated abnormal process detection in Kubernetes clusters.

In one embodiment, a baseline of behavior is received for a set of containers utilized by the Kubernetes manager from a cluster agent. The processes running on the set containers and network traffic generated by the set of containers, to identify anomalous behavior relative to the baseline.

In another embodiment, container updates are configured when received from a Kubernetes server that that registers containers for distribution to a plurality Kubernetes managers concerning a new version of the set of containers. Subsequent to the container updates, and responsive to detecting the anomalous behavior exceeds a threshold for a specific container, anomalous data is sent to the cluster agent including an identification and version of the specific container and a description of abnormal behavior. The cluster agent determines a new rule is necessary to define the new behavior and distributes the new rule to the plurality of Kubernetes managers that are affected.

In yet another embodiment, the new rule is received and implemented with respect to the container updates while running processes. A security action can then be taken based on the federated analysis.

Advantageously, network performance is improved with quickly updated dynamic container rules.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a node agent of the system of FIG. 1, according to one embodiment.

FIG. 3 is a more detailed block diagram illustrating a Kubernetes manager server, according to one embodiment.

DETAILED DESCRIPTION

Methods, computer program products, and systems for federated abnormal process detection in Kubernetes clusters. The following disclosure is limited only for the purpose of conciseness, as one of ordinary skill in the art will recognize additional embodiments given the ones described herein.

I. Systems for Federated Abnormal Process Detection (FIGS. 1-3)

Figure 1:
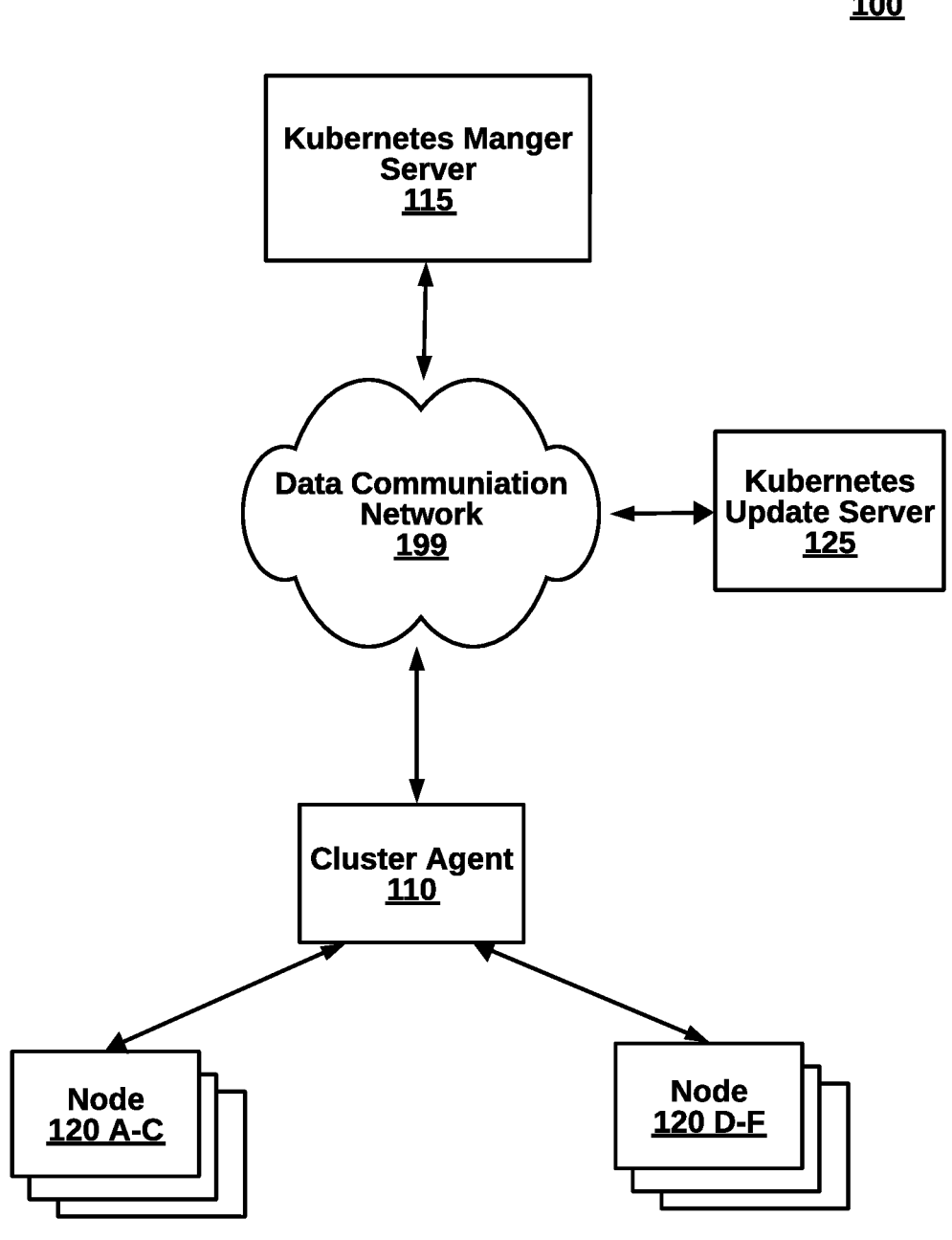
FIG. 1 is a high-level block diagram illustrating aspects of a system for federated abnormal process detection in Kubernetes clusters, according to some embodiments.
Figure 6:
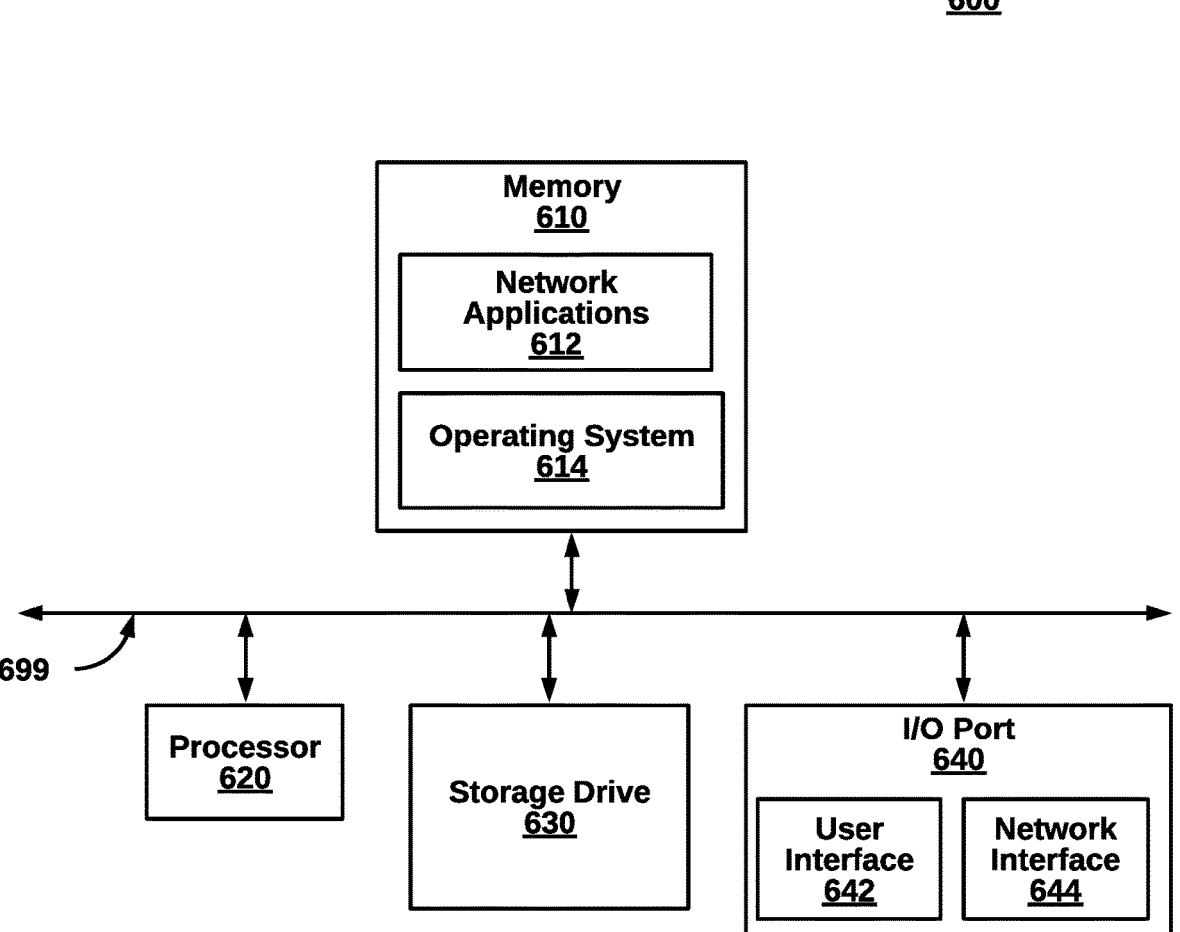
FIG. 6 is a block diagram illustrating an example computing device for the system of FIG. 1, according to one embodiment.

FIG. 1 is a high-level block diagrams illustrating a system 100 for federated abnormal process detection in Kubernetes clusters, according to an embodiment. The system 100 includes a cluster agent 110, nodes 120A-C of LAN 101 and also nodes 120D-F of LAN 102. Outside of enterprise networks, a Kubernetes manager server 115 and a Kubernetes update server 125 are connected to the date communication network 199, as well. Other configurations of the system 100 can include additional components that are not shown in FIG. 1, such as routers, switches, network gateways, and firewalls. For example, the system 100 of FIG. 1 shows one cluster agent and six nodes, however, other examples have hundreds of nodes connected to multiple cluster distributed over different LANs and centralized at the central Kubernetes manager server 115. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi controller 110, access point 120). The components can also be connected via wireless networking (e.g., stations 140A,B). The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPv4 or IPv6 address spaces.

In an embodiment, the system 100 can perform a run-time adaptation of normal image list for the specific customer. The system 100 will dynamically collect a list of running binaries per container image, rather than statically. Once a new or unknown binary is executed in the image, it will preferably receive an abnormality score indicative a potential attack. In addition, outliers can be dynamically identified, i.e., binaries that are not usually executed with the container. A list of running binaries and dynamic libraries per running image is collected on each node in each cluster. This is done by a node agent, i.e., pod running on each node.

The image, of a specific node, can then sent to the cluster agent, i.e., a container or pod running in the cluster that is responsible for federated learning of the binaries. The cluster agent updates its aggregated list of binaries per image and sends changes to all the nodes in the cluster. The list has an aggregation of how many times each binary was seen as executed in the image, altogether across nodes. The more times it was executed, the less is its abnormality score. Thus, every node in the cluster has an updated list. Notice that it gets only the updates to the previous list sent by the cluster agent. Node agent maintains a list that was received from cluster agent and the list of its own updates. Once it receives a new list from cluster agent, it will replace both lists with a new one.

When a new binary is executed on a given node, the relevant node agent checks whether it is present in the current list of binaries for the relevant image. If not, then it gets the highest abnormality score. If it is present, then it gets the abnormality score according to the list. The binary will be sent to the cluster agent in the next cycle.

Similar to federated learning approach, it is also possible to get updates from specific nodes in the cluster, as chosen by the cluster agent.

The Kubernetes manager server 115 is a top-level aggregator, and new container version rule generator, from a cloud perspective. In one case, a third-party runs a software-as-a-service to update local cluster agent rules for different enterprises. Meanwhile, the cluster agent 110 can reside locally on an enterprise network, or can also be modified for the cloud. The nodes 120A-F can represent a network device itself, or a junction of devices downstream from the node as a location marker within a network. For example, the node can be a network gateway running firewall instances on the virtual machines.

FIG. 2 is a more detailed block diagram illustrating the cluster agent 110 of the system of FIG. 1, according to one embodiment. The cluster 110 includes a baseline profile module 210, a container update module 220, a federated container daemon 230, and a security action module 240. The components can be implemented in hardware, software, or a combination of both.

The baseline profile module 210 requesting and storing a baseline of behavior for a set of containers utilized by the Kubernetes manager from a cluster agent, for each version of containers. The processes running on the set containers and network traffic generated by the set of containers can be monitored by the baseline profile module to identify anomalous behavior relative to the baseline.

A container update module 220 can download and install new versions of containers. In some embodiments, a Kubernetes server can be periodically checked or can periodically push updates. The Kubernetes server, in general, is a centralized repository for distributing containers. Each container can be registered for distribution to a plurality of federated Kubernetes managers concerning a new version of the set of containers. The federation can include as many as possible nodes or be limited to a subset, such as node associated with a particular enterprise, a particular network device or a particular network function.

The federated container daemon 230 can, subsequent the container updates, and responsive to detecting the anomalous behavior exceeds a threshold for a specific container, send anomalous data to the cluster agent including an identification and version of the specific container and a description of abnormal behavior. The cluster agent determines a new rule is necessary to define the new behavior and distributes the new rule to the plurality of Kubernetes managers that are affected. The new rule is received back by the federated container daemon 230 and is implemented with respect to the container updates while running processes. For example, data traffic output by the process may not be classified as normal and avoid a false positive of malicious activity.

The security action module 240 can take action based on the new rule. In one case, the new rule is indicative of accepting the suspicious behavior as normal, and in another case, of securing against the process. The actions can include blocking processes, stopping virtual machines, taking a snapshot of the process, quarantining, checking upstream for guidance, and the like.

FIG. 3 is a more detailed block diagram illustrating the Kubernetes manager server 115, according to one embodiment.

II. Methods for Federated Abnormal Process Detection (FIGS. 4-5)

Figure 4:
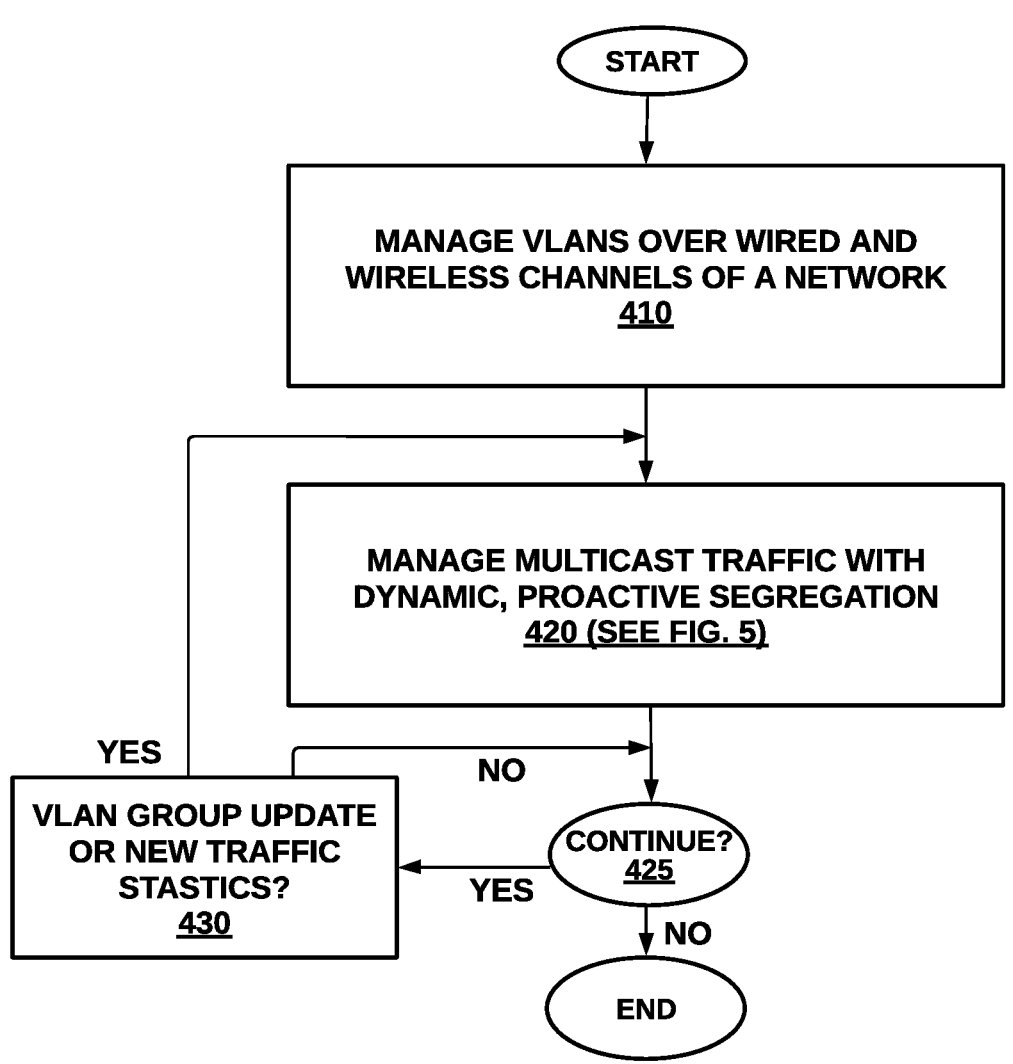
FIG. 4 is a high-level flow diagram illustrating a method for federated abnormal process detection in Kubernetes clusters, according to an embodiment.
Figure 5:
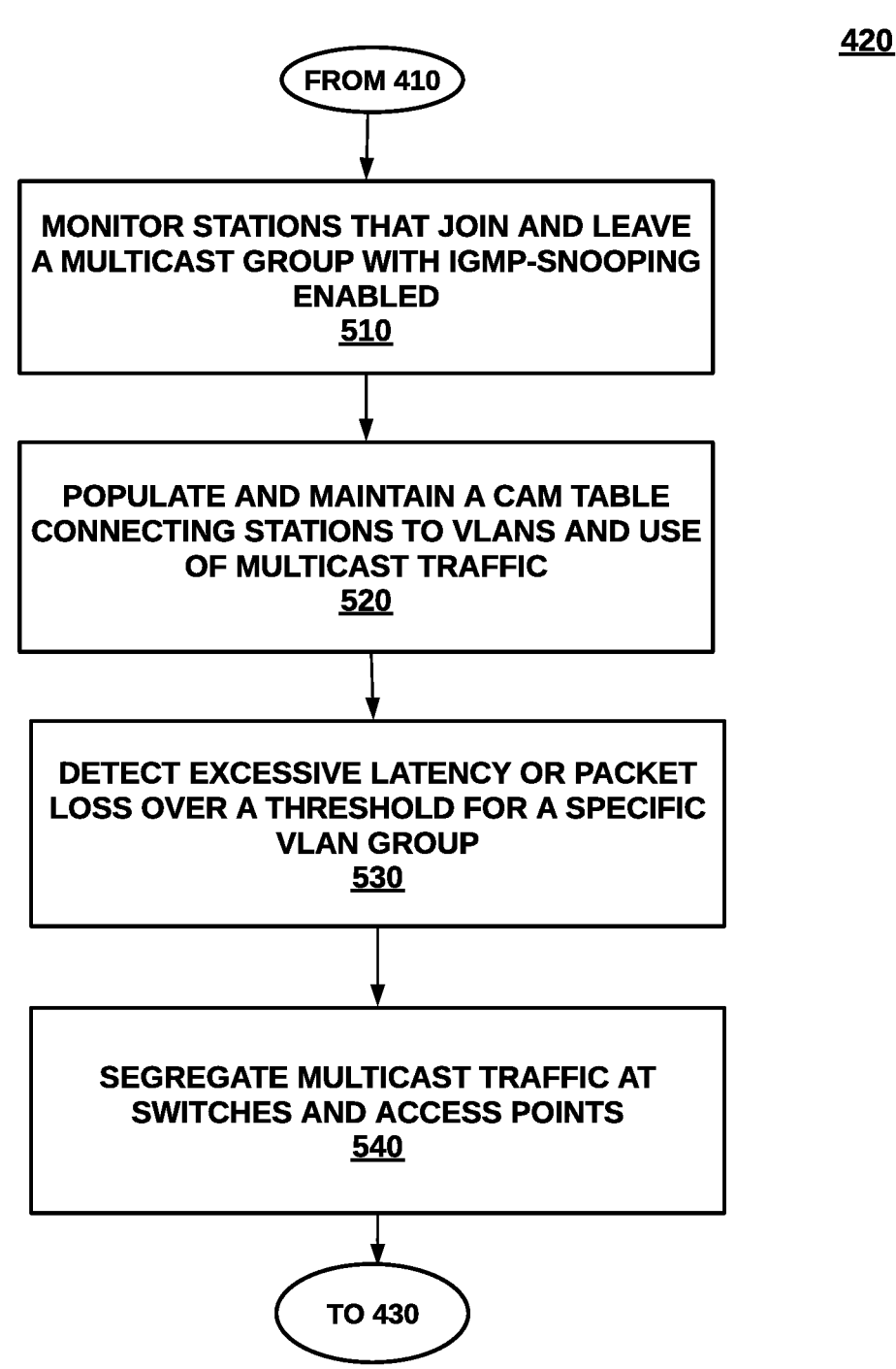
FIG. 5 is a more detailed flow diagram illustrating a step for dynamically updating rules for new versions of containers, from the method of FIG. 4, according to one embodiment.

FIG. 4 is a high-level flow diagram of a method 400 for federated abnormal process detection in Kubernetes clusters, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 410, requesting a baseline of behavior for a set of containers utilized by the Kubernetes manager from a cluster agent.

At step 420, monitoring processes running on the set containers and network traffic generated by the set of containers, to identify anomalous behavior relative to the baseline.

At step 420, dynamically updating rules for new versions of containers, as described in more detail in association with FIG. 5.

At step 430, responsive to detecting a new process, in an existing container or a new container, abnormal process detection can be performed.

FIG. 5 is a more detailed flow diagram detailing the step 420 of dynamically updating rules for new versions of containers. Other variations are possible for different implementations.

At step 510, container updates are configured when received from a Kubernetes server that that registers containers for distribution to a plurality Kubernetes managers concerning a new version of the set of containers.

At step 520, subsequent to the container updates, and responsive to detecting the anomalous behavior exceeds a threshold for a specific container, anomalous data is sent to the cluster agent including an identification and version of the specific container and a description of abnormal behavior. The cluster agent determines a new rule is necessary to define the new behavior and distributes the new rule to the plurality of Kubernetes managers that are affected.

At step 530, the new rule is received and implemented with respect to the container updates while running processes.

At step 540, a security action is taken based on the federated analysis.

III. Computing Device for Federated Abnormal Process Detection (FIG. 6)

FIG. 6 is a block diagram illustrating a computing device 600 for use in the system 100 of FIG. 1, according to one embodiment. The computing device 600 is a non-limiting example device for implementing each of the components of the system 100, including the cluster agent 110 and nodes 120A-F. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Kubernetes node agent on a data communication network, for federated abnormal process detection in Kubernetes clusters, the method comprising:

requesting a baseline of behavior for a set of containers utilized by a Kubernetes manager server from a cluster agent;

monitoring processes running on the set containers and network traffic generated by the set of containers, to identify anomalous behavior relative to the baseline;

configuring container updates received from the Kubernetes manager server that registers containers for distribution to a plurality Kubernetes clusters concerning a new version of the set of containers;

subsequent to the container updates, and responsive to detecting the anomalous behavior exceeds a threshold for a specific container, sending anomalous data to the cluster agent including an identification and version of the specific container and a description of the abnormal behavior, wherein the cluster agent determines a new rule is necessary to define the new behavior and distributes the new rule to the plurality of Kubernetes managers that are affected;

receiving the new rule and implementing the new rule with respect to the container updates while running processes; and taking action based on analysis.

2. The method of claim 1, further comprising detecting abnormal behavior for a new version of the specific container relative to a previous version of the specific container.

3. The method of claim 1, wherein the new rule from the cluster agent indicates that abnormal behavior is acceptable for the new version of the specific container.

4. The method of claim 1, wherein the step of taking the action comprises temporary blocking execution of the new version of the container.

5. The method of claim 1, wherein a second new rule issued from the cluster agent indicates that the abnormal behavior that was not acceptable is now acceptable, due to surpassing a threshold aggregate count of successful executions from the plurality of nodes.

6. The method of claim 1, wherein the Kubernetes server notifies the cluster agent of version updates for containers.

7. A non-transitory computer-readable medium in a Kubernetes node agent on a data communication network, for federated abnormal process detection in Kubernetes clusters, the method comprising:

requesting a baseline of behavior for a set of containers utilized by a Kubernetes manager server from a cluster agent;

monitoring processes running on the set containers and network traffic generated by the set of containers, to identify anomalous behavior relative to the baseline;

configuring container updates received from the Kubernetes manager server that registers containers for distribution to a plurality Kubernetes managers concerning a new version of the set of containers;

subsequent to the container updates, and responsive to detecting the anomalous behavior exceeds a threshold for a specific container, sending anomalous data to the cluster agent including an identification and version of the specific container and a description of abnormal behavior, wherein the cluster agent determines a new rule is necessary to define the new behavior and distributes the new rule to the plurality of Kubernetes managers that are affected;

receiving the new rule and implementing the new rule with respect to the container updates while running processes; and taking action based on analysis.

8. A Kubernetes node agent on a data communication network, for federated abnormal process detection in Kubernetes clusters, the Kubernetes node agent comprising:

a processor;

a network interface communicatively coupled to the processor and to a data communication network; and a memory, communicatively coupled to the processor and storing:

a baseline module to receive a baseline of behavior for a set of containers utilized by a Kubernetes manager server from a cluster agent;

monitoring processes running on the set containers and network traffic generated by the set of containers, to identify anomalous behavior relative to the baseline;

configuring container updates received from the Kubernetes manager server that that registers containers for distribution to a plurality Kubernetes managers concerning a new version of the set of containers;

subsequent to the container updates, and responsive to detecting the anomalous behavior exceeds a threshold for a specific container, sending anomalous data to the cluster agent including an identification and version of the specific container and a description of abnormal behavior, wherein the cluster agent determines a new rule is necessary to define the new behavior and distributes the new rule to the plurality of Kubernetes managers that are affected;

receiving the new rule and implementing the new rule with respect to the container updates while running processes; and taking action based on analysis.

* * * * *